US008235479B2

United States Patent
Yu et al.

(10) Patent No.: US 8,235,479 B2
(45) Date of Patent: Aug. 7, 2012

(54) SLIDE ASSEMBLY

(75) Inventors: Mo-Ming Yu, Shenzhen (CN); Guang-Hua Gu, Shenzhen (CN); Ze-Hong Chen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 76 days.

(21) Appl. No.: 12/788,309

(22) Filed: May 27, 2010

(65) Prior Publication Data

US 2011/0234071 A1 Sep. 29, 2011

(30) Foreign Application Priority Data

Mar. 23, 2010 (CN) .......................... 2010 1 0131008

(51) Int. Cl.
*A47B 88/00* (2006.01)

(52) U.S. Cl. ............................... 312/334.16; 312/334.8

(58) Field of Classification Search ............... 312/334.1, 312/333, 334.7, 334.8, 334.16, 334.36, 330.1, 312/334.44, 334.4; 384/20, 21
See application file for complete search history.

(56) References Cited

U.S. PATENT DOCUMENTS

| | | | | |
|---|---|---|---|---|
| 1,071,006 | A * | 8/1913 | Little | 384/21 |
| 3,092,429 | A * | 6/1963 | Barnes | 312/333 |
| 3,211,510 | A * | 10/1965 | Hahn et al. | 312/334.31 |
| 4,101,178 | A * | 7/1978 | Adams et al. | 384/21 |
| 4,210,303 | A * | 7/1980 | Torta et al. | 248/429 |
| 4,516,811 | A * | 5/1985 | Akiyama et al. | 384/34 |
| 5,681,116 | A * | 10/1997 | Lin | 384/42 |
| 6,938,967 | B2 * | 9/2005 | Dubon et al. | 312/333 |
| 7,364,245 | B2 * | 4/2008 | Dubon | 312/334.9 |
| 2004/0155563 | A1 * | 8/2004 | Young et al. | 312/334.8 |
| 2008/0129169 | A1 * | 6/2008 | Daino et al. | 312/334.1 |

* cited by examiner

*Primary Examiner* — Darnell Jayne
*Assistant Examiner* — Andres F Gallego
(74) *Attorney, Agent, or Firm* — Altis Law Group, Inc.

(57) ABSTRACT

A slide assembly includes a first slide and a second slide. The second slide is received in the first slide. The second slide includes a first bent portion. The first bent portion linearly contacts with an inner side of the first slide along an extending direction of the second slide.

15 Claims, 3 Drawing Sheets

SLIDE ASSEMBLY

BACKGROUND

1. Technical Field

The present disclosure relates to a slide assembly, and particularly to a slide assembly without a slide-aiding ball member.

2. Description of Related Art

A typical three-section slide for a server unit includes an inner slide, an outer slide, and a third slide. The inner slide is received in the third slide and the third slide is received in the outer slide. The inner slide can slide in the third slide and the third slide can slide in the outer slide. However, there is a lot of friction when the inner slide slides in the third slide or the third slide slides in the outer slide.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
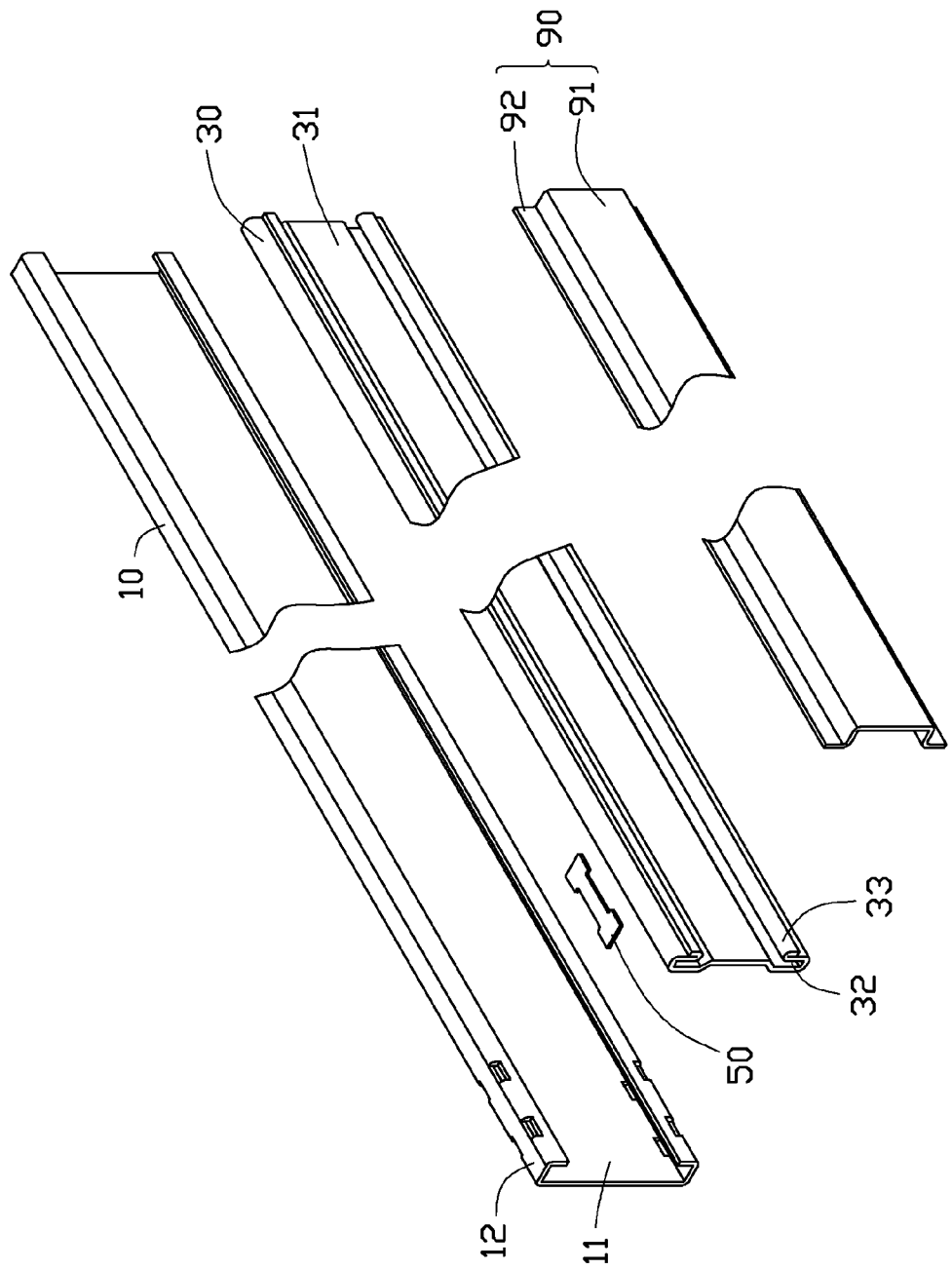
FIG. 1 is an exploded view of a slide assembly in accordance with one embodiment.
Figure 2:
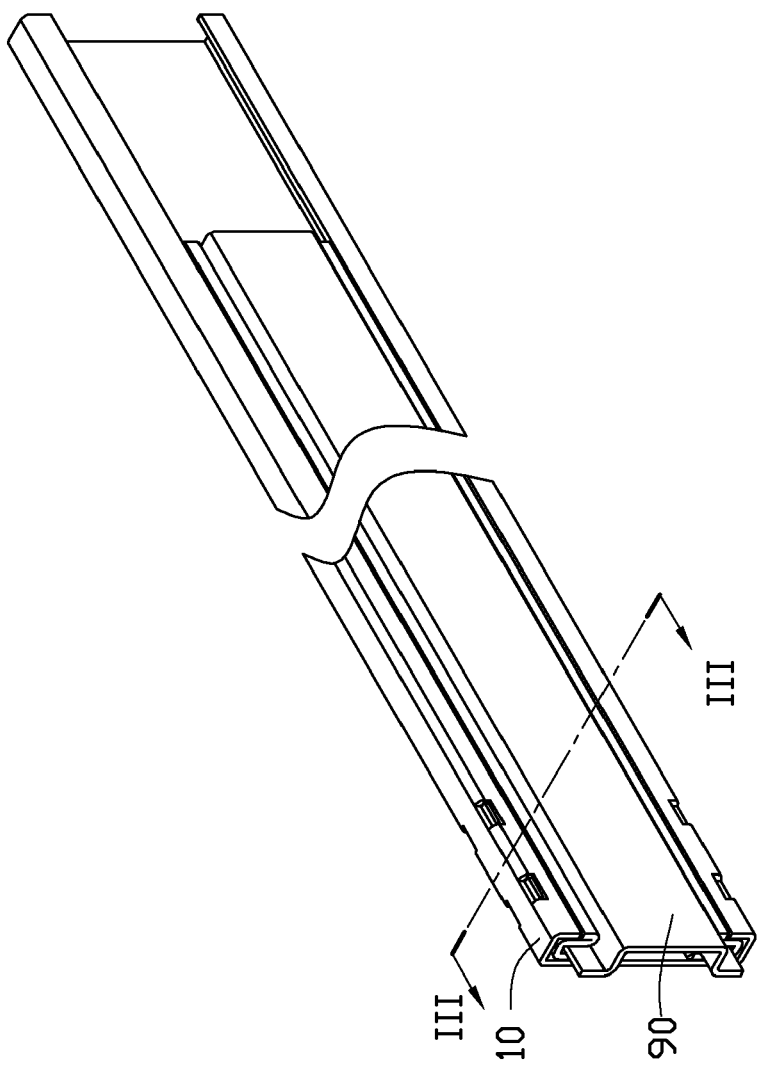
FIG. 2 is an assembled view of a slide assembly according to an embodiment.
Figure 3:
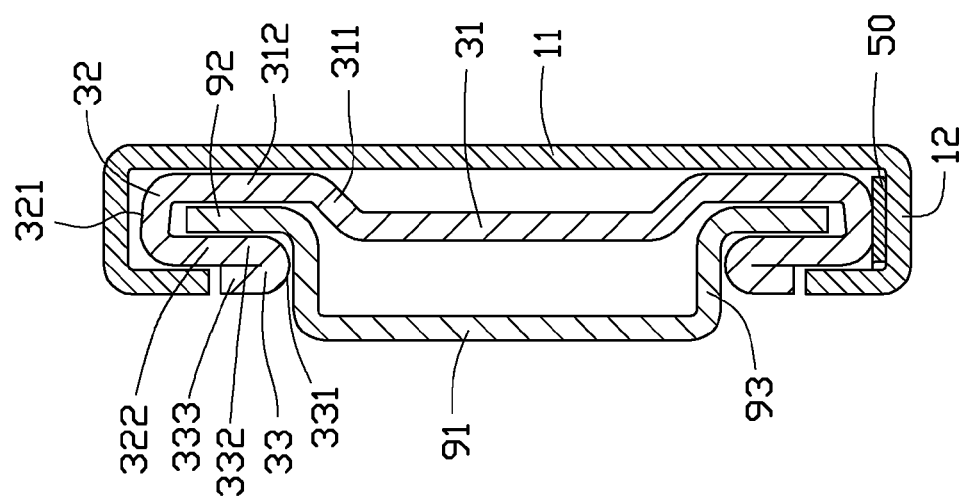
FIG. 3 is a cross-sectional view taken along line 3-3 of FIG. 2.

Referring to FIGS. 1-3, a slide assembly includes a first slide 10, a second slide 30, and a third slide 90. The second slide 30 is telescopically extensile from within the first slide 10. The third slide 90 is telescopically extensile from within the second slide 30. The first slide 10 includes a body 11 and two receiving portions 12 perpendicularly bent from two ends of the body 11. The receiving portion 12 is "U" shaped. The receiving portion 12 receives the second slide 30. A cross section of the first slide 10 is "C" shaped.

The second slide 30 includes a body 31 parallel with the body 11 of the first slide 10. Two first flanges 311 are bent from two ends of the body 31 towards the first slide 10. A second flange 312 extends outwards from each first flange 311 to be parallel with the body 31 of the second slide 30. A third flange 321 perpendicularly extends from the second flange 312. The third flange 321 has a first arc surface. The third flange 321 only linearly contacts an inner side of the first slide 10 along an extending direction of the second slide 30. The third flange 321 linearly contacts the receiving portion 12. A fourth flange 322 is perpendicularly bent from the third flange 321 to be parallel with the second flange 312. A first bent portion 32 is formed through the second flange 312, the third flange 321 and the fourth flange 322. The first bent portion 32 is U-shaped. The third slide 90 is received in the first bent portion 32.

A gasket 50 is fixed between the first arc surface 321 and the first slide 10. The gasket 50 can be made from polyoxymethylene, in one example. The gasket 50 is located an end of the first slide 10. The end of the first slide 10 may carry a heavy thing. For example, the slide assembly is a track device for drawers. The end of the first slide 10 bears the drawers. The drawers can be slidably opened or closed by the slide assembly. The gasket 50 can decrease friction between the second slide 30 and the first slide 10 when the second slide 30 slides along the first slide 10.

A second bent portion 33 is bent back from the first bent portion 32. The second bent portion 33 blocks the third slide 90. A second arc surface 331 is formed on the second bent portion 33. The second arc surface 331 linearly contacts the third slide 90. The second bent portion 33 includes a fifth flange 332 extending from the fourth flange 322 and a sixth flange 333 bent from the fifth flange 332.

The fifth flange 332 and the fourth flange 322 are on the same plane. The sixth flange 333 contacts the fifth flange 332. The sixth flange 333 is parallel with the fifth flange 332. The second arc surface 331 is formed between the fifth flange 332 and the sixth flange 333.

The third slide 90 includes a body 91, two connecting portions 93 extending from two ends of the body 91, and two flanges 92 respectively extending from two connecting portions 93. The flanges 92 are received in the first bent portion 32. The body 91 is parallel with the body 31 of the second slide 30. The connecting portions 93 contact the second arc surface 331. The second bent portion 33 supports the connecting portions 93. The fifth flange 332 and the sixth flange 333 reinforce the bent portion 33. The connecting portions 93 are perpendicular to the body 11 of the first slide 10.

Referring also to FIGS. 2-3, in assembly, the gasket 50 is received in the receiving portion 12. The second slide 30 is received in the receiving portion 12. The gasket 50 is sandwiched between the first slide 10 and the second slide 30. The flange 92 is inserted in the first bent portion 32. The first arc surface 321 linearly contacts the first slide 10. The gasket 50 decreases friction between the second slide 30 and the first slide 10. The second arc surface 331 linearly contacts the third slide 90.

When the third slide 90 is pulled outward, the second arc surface 331 linearly contacts the third slide 90 to decrease friction. When the second slide 30 is pulled outward, the first arc surface 321 contacts the first slide 10 to decrease friction. Further, the gasket 50 is located between the first arc surface 321 and the receiving portion 12 to decrease friction when the second slide 30 is pulled outward. When the second slide 30 retracts into the first slide 10, the first arc surface 321 contacts the first slide 10 to decrease friction. Further, the gasket 50 is located between the first arc surface 321 and the receiving portion 12 to decrease friction when the second slide 30 is retracted into the first slide 10.

The second slide 30 slides in the first slide 10 and the third slide 90 slides in the second slide 30 without bearings, but can smoothly slide in the first slide 10 and the third slide 90 can smoothly slide in the second slide 30. The slide assembly can save costs. The slide assembly can be used on electronic devices, for example, a server rack. The slide assembly can also be used in furniture, for example, a drawer.

While the present disclosure has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

What is claimed is:

1. A slide assembly, comprising:
   a first slide; and
   a second slide telescopically extendable from within the first slide, the second slide comprising a first bent portion and a second bent portion, the first bent portion only linearly contacting an inner side of the first slide along an extension direction of the second slide;

a third slide fixed on an inner side of the second slide, the third slide comprising a body, a flange and a connecting portion located between the body and the flange;

wherein the connecting portion is substantially perpendicular to the body and the flange, and the second bent portion only linearly contacts the connecting portion; wherein a first arc surface is formed on the first bent portion to linearly contact the first slide; wherein a second arc surface is formed on the second bent portion, and the second arc surface makes contact with the connecting portion; and wherein the second bent portion back bends from an end of the first bent portion.

2. The slide assembly of claim 1, wherein the flange is inserted in the first bent portion.

3. The slide assembly of claim 1, wherein the second bent portion blocks the third slide.

4. The slide assembly of claim 1, wherein a cross section of the first slide is C-shaped.

5. The slide assembly of claim 1, wherein a gasket is secured between the first bent portion and the first slide to decrease friction.

6. The slide assembly of claim 5, wherein the gasket is made from polyoxymethylene.

7. The slide assembly of claim 1, wherein the first bent portion is a "U" shape.

8. A slide assembly, comprising:
an inner slide and comprising a body, a flange and a connecting portion located between the body and the flange;
an outer slide receiving the inner slide;
a middle slide telescopically extensile from within the outer slide, the middle slide comprising a first bent portion and a second bent portion, the first bent portion linearly contacting an outer side of the inner slide along an extensile direction of the inner slide;
wherein the connecting portion is substantially perpendicular to the body and the flange, and the second bent portion only linearly contacts the connecting portion; wherein a first arc surface is formed on the first bent portion to linearly contact the inner slide; wherein a second arc surface is formed on the second bent portion, and the second arc surface makes contact with the connecting portion; and wherein the second bent portion is bent back from an end of the first bent portion.

9. The slide assembly of claim 8, wherein the flange is inserted in the first bent portion.

10. The slide assembly of claim 8, wherein the second bent portion blocks the inner slide.

11. The slide assembly of claim 8, wherein the second bent portion is a "U" shape.

12. The slide assembly of claim 8, wherein a cross section of the outer slide is a "C" shape.

13. The slide assembly of claim 8, wherein a gasket is secured between the first bent portion and the outer slide to decrease friction.

14. The slide assembly of claim 13, wherein the gasket is made from polyoxymethylene.

15. A slide assembly, comprising:
an inner slide and comprising a body and a flange;
an outer slide receiving the inner slide;
a middle slide telescopically extensile from within the outer slide, the middle slide comprising a first bent portion;
a gasket located between the first bent portion and the outer slide to increase friction;
wherein the flange is inserted into the first bent portion to make contact linearly with the first bent portion, and the first bent portion makes contact with the outer slide by the gasket wherein the inner side further comprises a connecting portion located between the body and the flange, the middle slide further comprises a second bent portion, wherein the connecting portion is substantially perpendicular to the body and the flange, and the second bent portion only makes contact linearly with the connecting portion; wherein an arc surface is formed on the second bent portion, and the arc surface makes contact with the connecting portion; and wherein the second bent portion is bent back from an end of the first bent portion.

* * * * *